United States Patent
Gadiraju et al.

(10) Patent No.: US 10,790,668 B1
(45) Date of Patent: Sep. 29, 2020

(54) METHOD FOR REACTIVE POWER OSCILLATION DAMPING FOR A WIND TURBINE SYSTEM WITH INTEGRATED REACTIVE POWER COMPENSATION DEVICE

(71) Applicant: General Electric Company, Schenectady, NY (US)

(72) Inventors: Kasi Viswanadha Raju Gadiraju, Bangalore (IN); Olive Ray, Kolkata (IN); Jayanti Navilgone Ganesh, Bangalore (IN); Arvind Kumar Tiwari, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/403,870

(22) Filed: May 6, 2019

(51) Int. Cl.
*F03D 7/00* (2006.01)
*H02J 3/16* (2006.01)
(Continued)

(52) U.S. Cl.
CPC .......... *H02J 3/1842* (2013.01); *F03D 7/0284* (2013.01); *F03D 9/255* (2017.02);
(Continued)

(58) Field of Classification Search
CPC . H02J 3/1842; H02J 3/386; H02J 3/24; H02P 9/007; H02P 9/10; H02P 2101/15;
(Continued)

(56) References Cited

U.S. PATENT DOCUMENTS 6,924,565 B2    8/2005  Wilkins et al.
7,013,203 B2    3/2006  Moore et al.
(Continued)

FOREIGN PATENT DOCUMENTS

CN    103955572 A    7/2014
CN    106451483 A    2/2017
(Continued)

OTHER PUBLICATIONS

Meegahapola et al., Capability Curve Based Enhanced Reactive Power Control Strategy for Stability Enhancement and Network Voltage Management, International Journal of Electrical Power and Energy Systems, vol. 52, Nov. 2013. pp. 96-106. (Abstract Only).
(Continued)

*Primary Examiner* — Charles R Kasenge
(74) *Attorney, Agent, or Firm* — Dority & Manning, P.A.

(57) ABSTRACT

A method for operating a wind turbine system, and associated system, provides real and reactive power to a grid. The wind turbine system includes a generator with a power converter and an integrated reactive power compensation device. A total reactive power demand (Qcmd) is made on the wind turbine system at a first grid state, and is allocated to generator reactive power (Qg) and compensation device reactive power (Qmvb). A first reactive power droop scheme is determined that includes a reactive power droop value applied to one or both of the control loops for (Qg) and (Qmvb) at the first grid state. Upon detection of a grid fault, the first reactive power droop scheme is changed to a second reactive power droop scheme by changing the reactive power droop values applied to one or both of the (Qg) and (Qmvb) control loops during recovery from the grid fault.

17 Claims, 7 Drawing Sheets

(51) Int. Cl.

| | |
|---|---|
| *H02J 3/18* | (2006.01) |
| *H02P 9/00* | (2006.01) |
| *H02M 5/458* | (2006.01) |
| *H02J 3/38* | (2006.01) |
| *H02P 9/10* | (2006.01) |
| *F03D 7/02* | (2006.01) |
| *F03D 9/25* | (2016.01) |
| *H02J 3/24* | (2006.01) |
| *H02P 101/15* | (2016.01) |

(52) U.S. Cl.
CPC ............... *H02J 3/24* (2013.01); *H02J 3/386* (2013.01); *H02M 5/4585* (2013.01); *H02P 9/007* (2013.01); *H02P 9/10* (2013.01); *F05B 2270/337* (2013.01); *F05B 2270/402* (2013.01); *H02P 2101/15* (2015.01)

(58) Field of Classification Search
CPC .... F03D 7/0284; F03D 9/255; H02M 5/4585; F05B 2270/402; F05B 2270/337
See application file for complete search history.

(56) References Cited

U.S. PATENT DOCUMENTS

| | | |
|---|---|---|
| 7,071,579 B2 | 7/2006 | Erdman et al. |
| 7,095,597 B1 | 8/2006 | Cousineau |
| 7,166,928 B2 | 1/2007 | Larsen |
| 7,245,037 B2 | 7/2007 | Angquist et al. |
| 7,567,160 B2 | 7/2009 | Folts et al. |
| 7,923,862 B2 | 4/2011 | Cardinal et al. |
| 8,653,685 B2 | 2/2014 | Garcia |
| 8,664,800 B2 | 3/2014 | Galbraith et al. |
| 8,847,562 B2 | 9/2014 | Agudo Araque |
| 9,214,883 B2 | 12/2015 | Kim et al. |
| 9,236,742 B2 | 1/2016 | Garcia |
| 9,318,988 B2 | 4/2016 | Larsen et al. |
| 9,366,233 B2 | 6/2016 | Bech et al. |
| 9,407,186 B2 | 8/2016 | Babazadeh et al. |
| 9,419,439 B2 | 8/2016 | Nielsen |
| 9,478,987 B2 | 10/2016 | Nelson |
| 9,556,852 B2 | 1/2017 | Babazacleh et al. |
| 9,556,853 B2 | 1/2017 | Gupta et al. |
| 9,660,448 B2 | 5/2017 | Ellena et al. |
| 9,920,745 B2 | 3/2018 | Fortmann |
| 2010/0332040 A1 | 12/2010 | Garcia |
| 2014/0175887 A1 | 6/2014 | Shao et al. |
| 2015/0137520 A1* | 5/2015 | Garcia ................... H02J 3/386 290/44 |
| 2016/0248253 A1* | 8/2016 | Zimmanck ............. H02J 3/382 |
| 2016/0268940 A1 | 9/2016 | Achilles et al. |
| 2016/0322821 A1 | 11/2016 | Saboor et al. |
| 2017/0025858 A1 | 1/2017 | Garcia et al. |
| 2017/0214248 A1* | 7/2017 | Rowe ..................... H02J 3/382 |
| 2017/0317498 A1 | 11/2017 | Guo et al. |
| 2017/0338652 A1* | 11/2017 | Ubben ................... H02J 3/383 |
| 2018/0145582 A1* | 5/2018 | Shuai ..................... H02M 1/32 |
| 2018/0301904 A1* | 10/2018 | Zimmanck ............. H02M 5/02 |
| 2019/0013754 A1 | 1/2019 | Wagoner et al. |
| 2019/0052082 A1* | 2/2019 | Zheng .................... H02J 3/381 |

FOREIGN PATENT DOCUMENTS

| | | |
|---|---|---|
| CN | 106532771 A | 3/2017 |
| CN | 107171335 A | 9/2017 |
| CN | 107834564 A | 3/2018 |
| EP | 2 482 421 A1 | 8/2012 |
| WO | WO2014/044007 A1 | 3/2014 |

OTHER PUBLICATIONS

Fan et al., On Active/Reactive Power Modulation of DFIG-based Wind Generation for Interarea Oscillation Damping, IEEE Transactions on Energy Conversion, vol. 26, Issue 2, Jun. 2011, pp. 513-521. (Abstract Only).

EP Search Report, dated Jun. 25, 2020.

\* cited by examiner

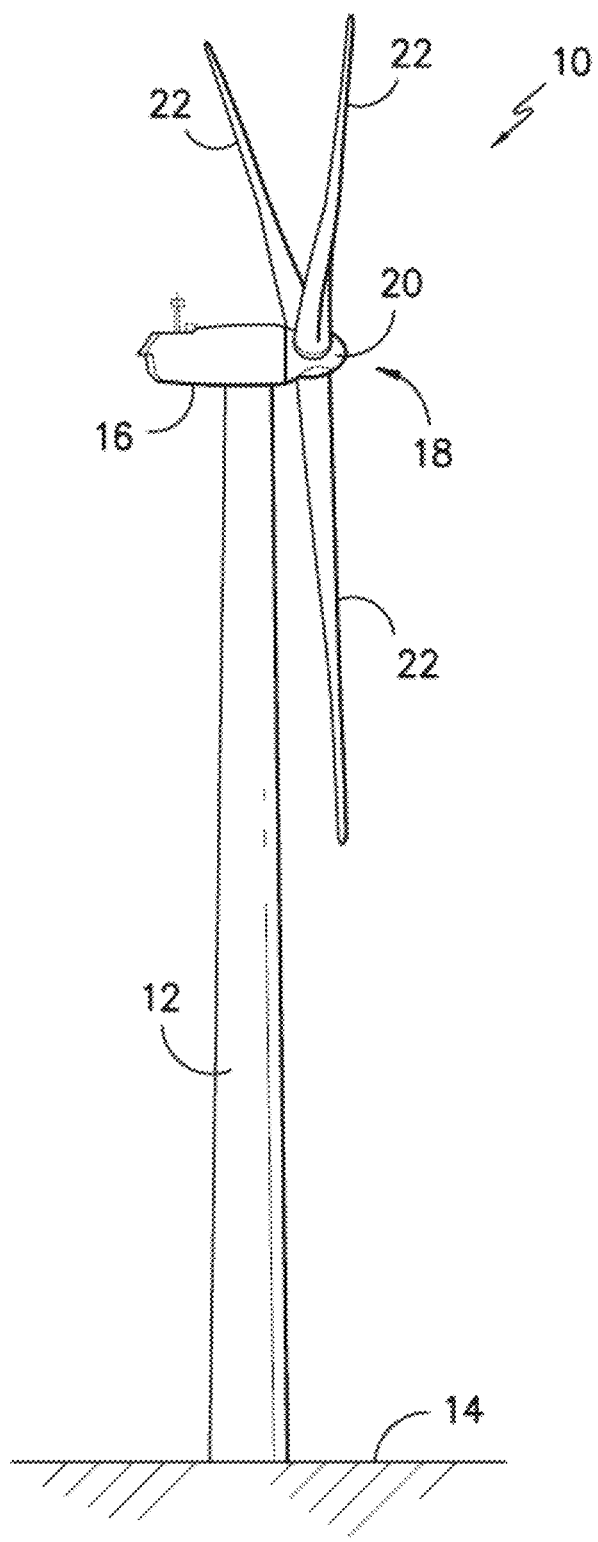
FIG. -1-

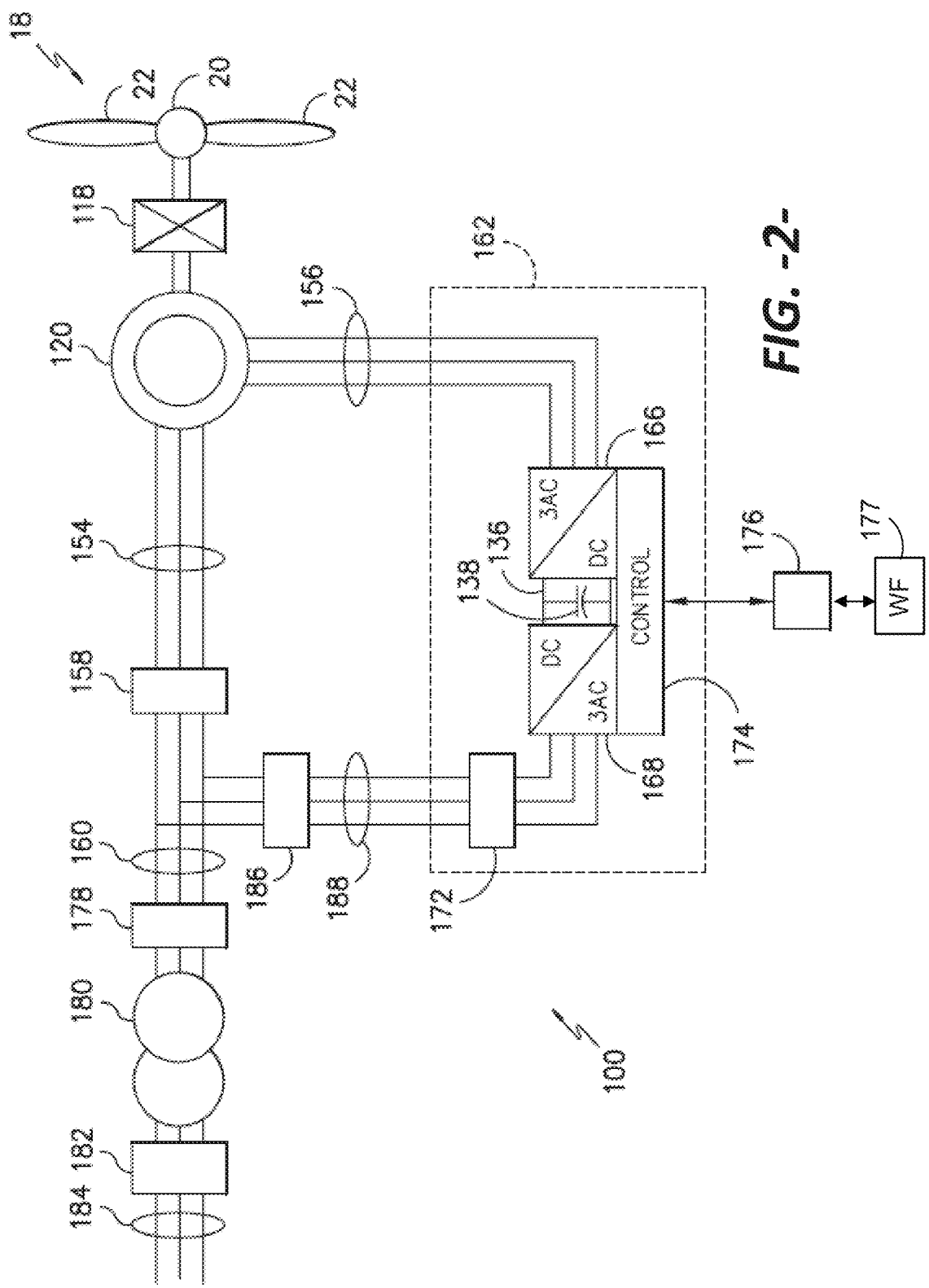
FIG. -2-

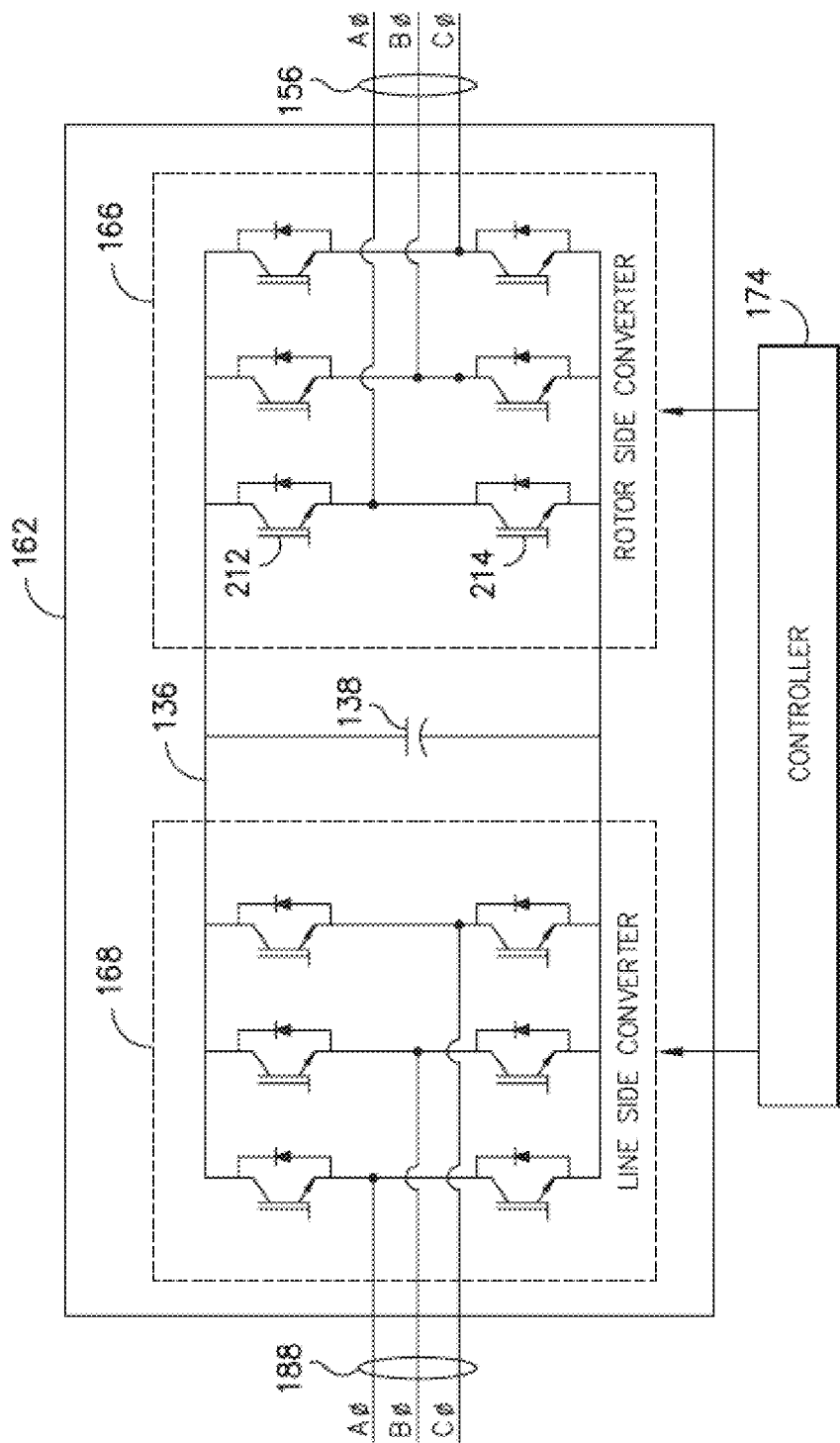
FIG. -3-

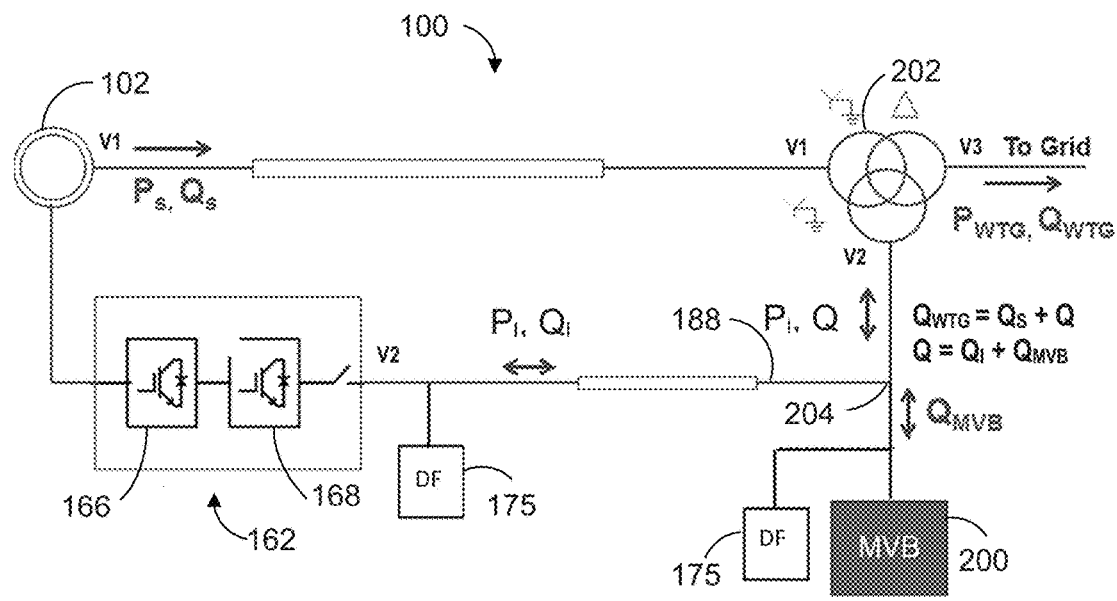
FIG. -4-
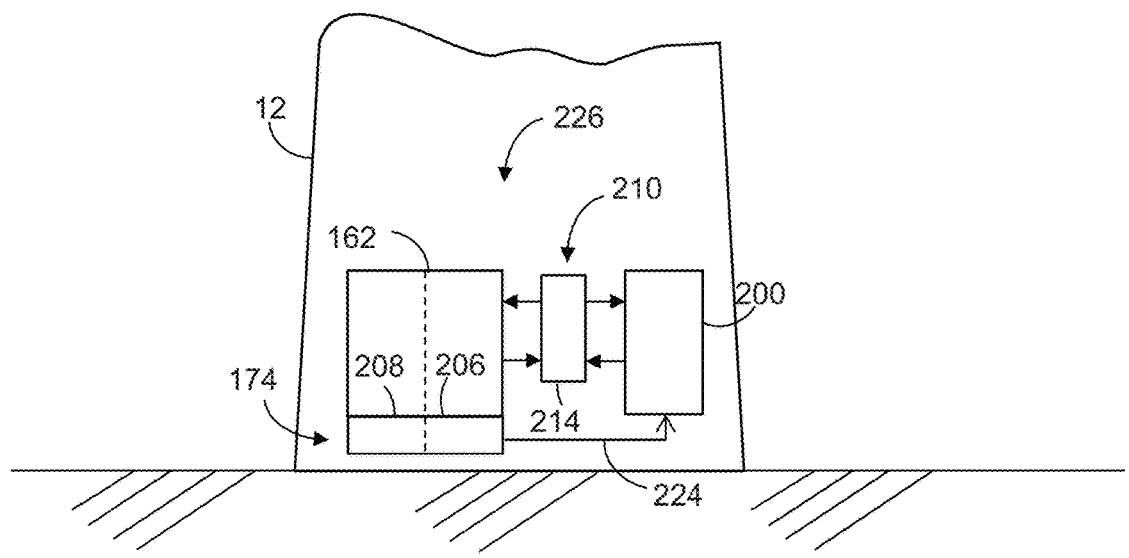
FIG. -5-

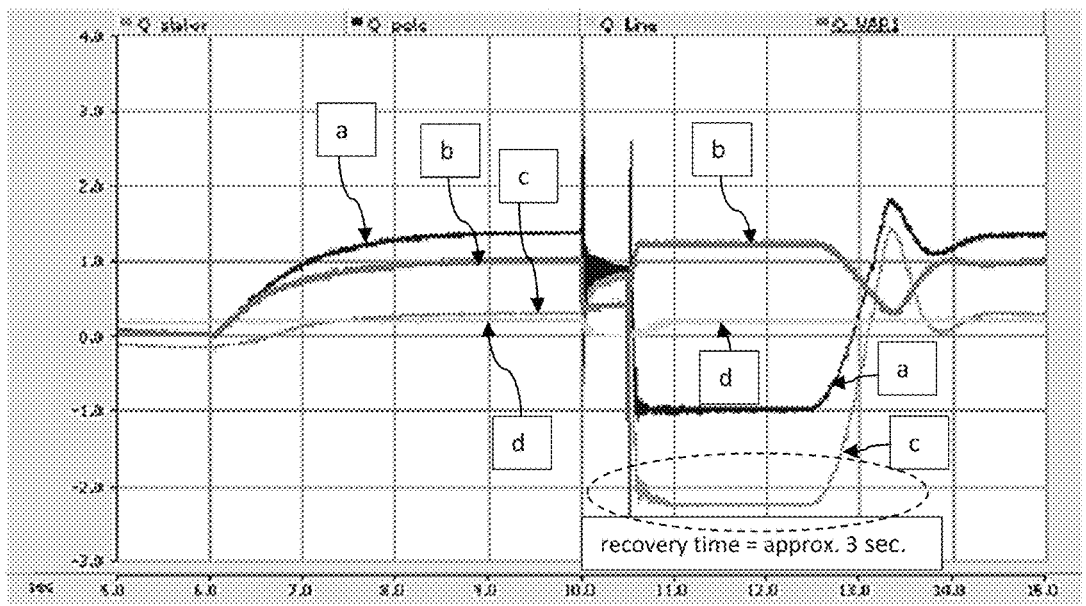
Voltage sag: 40%
Duration: 0.5 sec
Fault @ t= 10sec
Qg = 1500 kVar
Qmvb = 1000 kVAr
Qs = 300kVAr
Ql = 200kVAr
Droop Gains: — 215
DFIG: 5% droop
MVB: No droop
FIG. -6-
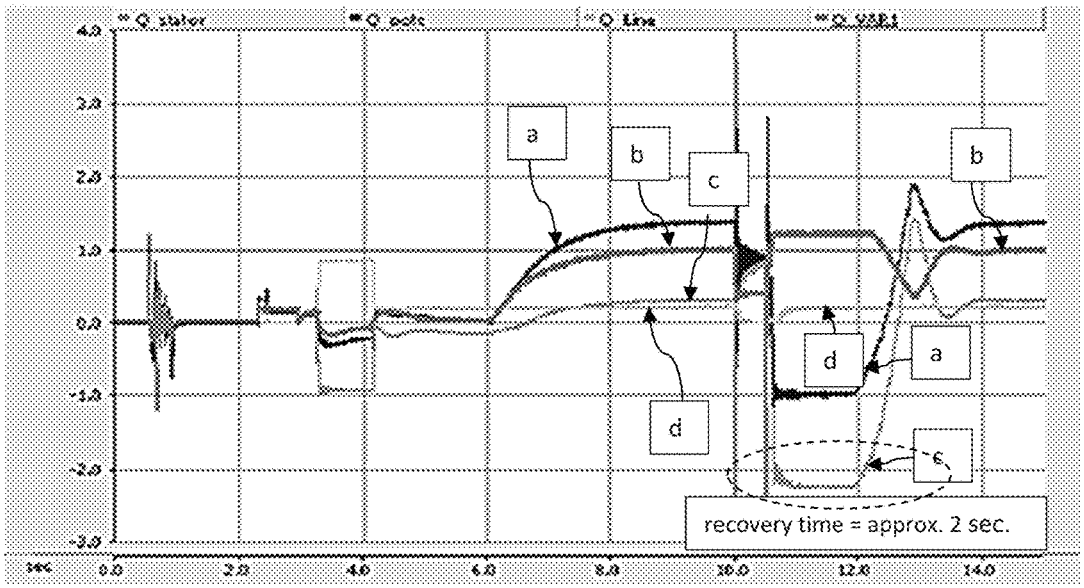
Voltage sag: 40%
Duration: 0.5 sec
Fault @ t= 10sec
Qg = 500 kVar
Qmvb = 1 MVAr
Adaptive Droop Gains:
Pre-fault — 215
DFIG: 5% droop
MVB: No droop
Post-fault (Voltage recovery) — 217
DFIG: 0% droop during fault
MVB: No droop
FIG. -7-

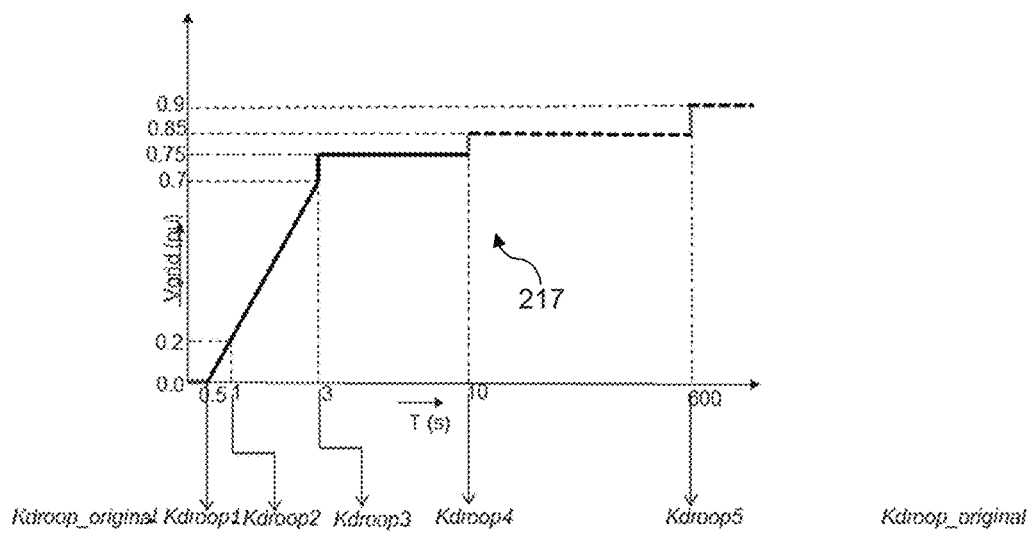
FIG. -8-
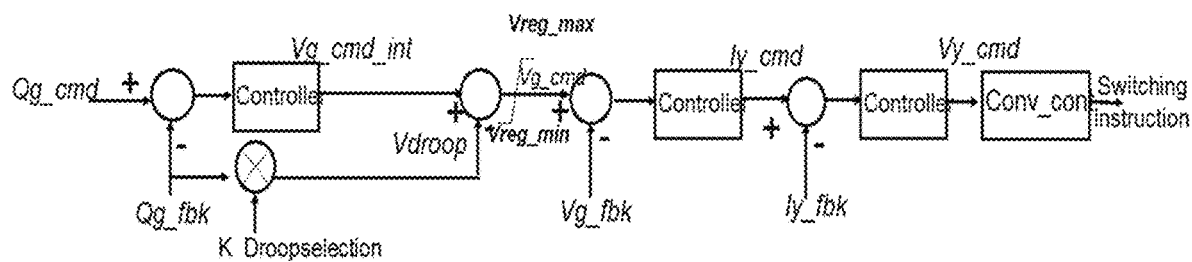
FIG. -10-

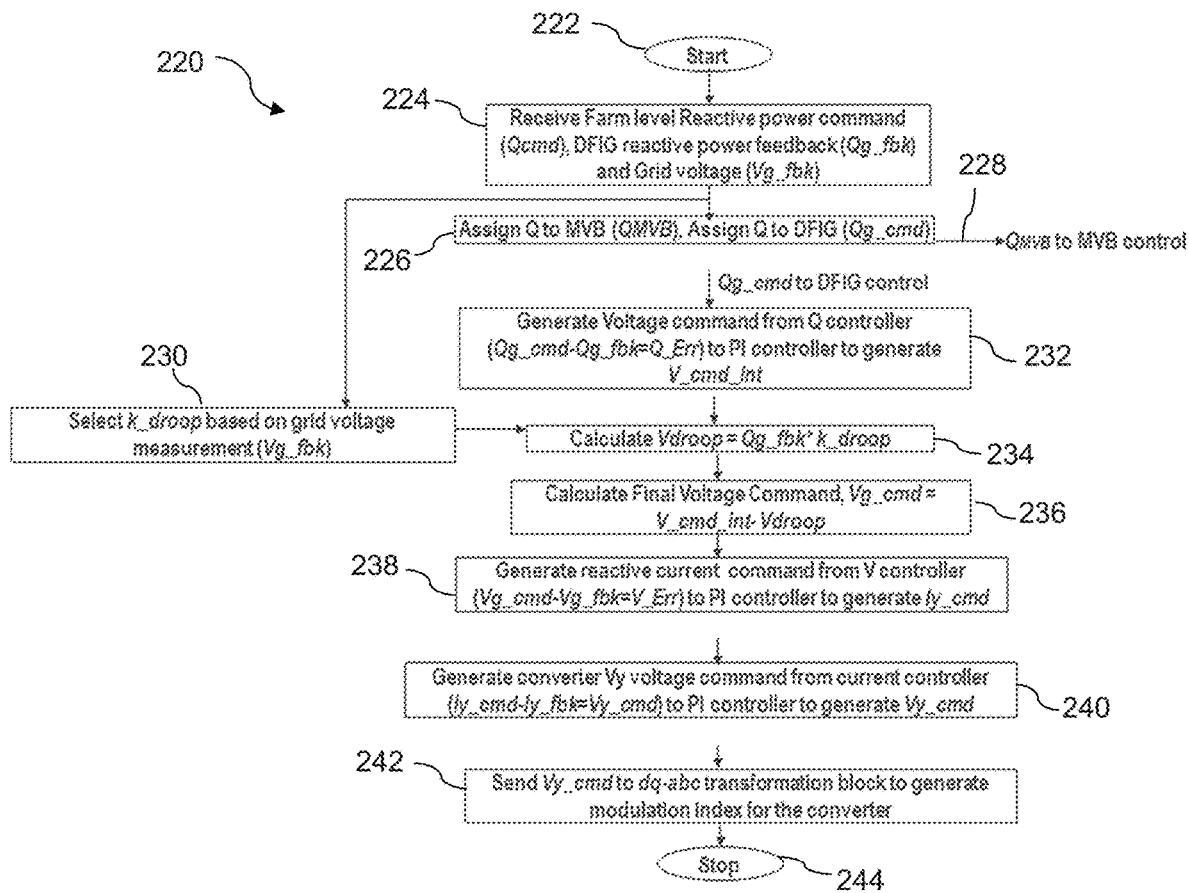
FIG. -9-

METHOD FOR REACTIVE POWER OSCILLATION DAMPING FOR A WIND TURBINE SYSTEM WITH INTEGRATED REACTIVE POWER COMPENSATION DEVICE

FIELD

The present disclosure relates generally to power generating systems, and, more particularly, to a system and method for coordinated control of various sources of reactive power in a wind turbine system.

BACKGROUND

Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. Each of the RSC and the LSC typically includes a bank of pulse width modulated switching devices, for example insulated gate bipolar transistors (IGBT modules). The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). Also, the primary source of reactive power from the DFIG system is from the RSC via the generator (generator stator-side reactive power) and the LSC (generator line-side reactive power). Use of the power converter, in particular the RSC, to control the rotor current/voltage makes it possible to adjust the reactive power (and real power) fed to the grid from the RSC independently of the rotational speed of the generator. In addition, the generator is able to import or export reactive power, which allows the system to support the grid during extreme voltage fluctuations on the grid.

Typically, the amount of reactive power to be supplied by a wind farm to the grid during steady-state and transient conditions is established by a code requirement dictated by the grid operator, wherein a wind farm controller determines the reactive power demand made on each wind turbine within the wind farm. A local controller at each wind turbine receives and allocates the reactive power demand between the generator sources (e.g., between generator-side reactive power and rotor-side reactive power).

It is known to augment the reactive power capability of a wind farm by use of reactive power compensation devices, such as Static VAR compensator (SVC) or Static VAR Generator (SVG) devices, at one or more common collector buses shared by the wind turbines. For example, U.S. Patent Application Pub. No. 2017/0025858 describes a wind power plant connected to an electrical grid, the power plant including a plurality of wind turbine generators and a Static Synchronous Compensator (STATCOM) device on a common bus with the wind turbine generators.

When reactive power sources are closely coupled, it is known to use a droop scheme to control the sources in order to minimize or dampen oscillations of reactive power between the sources. Such droop schemes are used in conventional wind turbine systems (and other conventional electronic-based power generating systems), wherein the common reactive power compensation devices are closely coupled with the individual wind turbines.

An improved system and method that integrate a dedicated auxiliary reactive power source at a local level within the wind turbine while dampening reactive power oscillations, particularly during FRT (fault ride through) events, would be desirable in the industry.

BRIEF DESCRIPTION

Aspects and advantages of the invention will be set forth in part in the following description, or may be obvious from the description, or may be learned through practice of the invention.

As mentioned above, conventional wind turbine system controls utilize a reactive power droop scheme between the generator and an auxiliary device (i.e., a reactive power compensation device) configured on a common bus with a plurality of wind turbines to dampen reactive power oscillations. The droop scheme generally remains unchanged between steady-state and transient grid states. The present invention proposes to integrate a dedicated reactive power compensation device with individual wind turbines, for example a device located at a down-tower location within the wind turbine tower and coupled to the power converter, and to utilize a novel reactive power droop scheme during transient voltage grid states in order to dampen reactive power oscillations between the generator and the reactive power compensation device that may be more prevalent due to direct coupling of the generator and the reactive power compensation device.

Thus, in one aspect, the present disclosure is drawn to a method for operating a wind turbine system that provides real and reactive power to a grid, the wind turbine system including a generator with a power converter and an integrated reactive power compensation device. The method includes receiving a total reactive power demand (Qcmd) made on the wind turbine system at a first grid state, such as a steady-state voltage on the grid. This (Qcmd) command may be generated, for example, by a farm-level controller in a wind farm that encompasses multiple wind turbines. The method also includes allocating (Qcmd) between generator reactive power (Qg) and compensation device reactive power (Qmvb). A first reactive power droop scheme is determined that includes a reactive power droop value (same or different) applied to one or both of the control loops for (Qg) and (Qmvb) at the first grid state. The first reactive power droop scheme is determined to minimize reactive power oscillations between the generator and the reactive power compensation device at steady-state grid voltages. Upon detection of a grid fault, such as a low, zero, or high voltage state, the first reactive power droop scheme is changed to a second reactive power droop scheme by changing the reactive power droop value applied to the control loop of one or both of (Qg) and (Qmvb) during recovery from the grid fault.

In a particular embodiment, the second reactive power droop scheme comprises a predefined profile during the voltage recovery of the wind turbine system from the grid fault. This profile may include one or a plurality of changed droop values during the recovery from the grid fault. For example, the predefined profile may include a plurality of different droop values that change at predefined times during the recovery from the grid fault.

A plurality of the predefined profiles may be stored in a look-up table and selected as a function of type of grid fault, or any other combination of variables, such as the (Qcmd) demand made on the wind turbine system, capacity of (Qg) and (Qmvb), and so forth.

It may be preferable that the reactive power droop value applied to the control loops of (Qg) and (Qmvb) in the second reactive power droop scheme are independently determined and have the same or different droop values during the course of recovery from the grid fault.

In certain embodiments, it has been found that the second reactive power droop scheme comprises zero droop applied to both of (Qg) and (Qmvb) for at least one predefined time period during the recovery from the grid fault.

In a particular method embodiment, the generator is a doubly fed induction generator (DFIG), and the power converter includes a line side converter (LSC) and a rotor side converter (RSC). With this embodiment, (Qg) includes a generator stator-side reactive power (Qs) component and a generator line-side reactive power (Ql) component. The reactive power compensation device is physically configured with the DFIG such that (Qmvb) combines with (Ql).

The present disclosure also encompasses a wind turbine system configured to supply real and reactive power to a grid, wherein the system includes a wind turbine with a tower, rotor, hub, and a plurality of blades coupled to the hub. A doubly fed induction generator (DFIG) system is coupled to the rotor, the DFIG system further including a power converter with a line side converter (LSC) and a rotor side converter (RSC), wherein the DFIG system is configured to generate a generator reactive power (Qg). A dedicated reactive power compensation device is operationally configured with the DFIG system to generate a reactive power (Qmvb). The reactive power compensation device may be any one or combination of a Static VAR compensator (SVC), a Static VAR Generator (SVG) device, or a Static Synchronous Compensator (STATCOM) device.

A control system/controller is configured with the wind turbine system to: receive a total reactive power demand (Qcmd) made on the wind turbine system at a first grid state; allocate (Qcmd) to generator reactive power (Qg) and compensation device reactive power (Qmvb); determine a first reactive power droop scheme that comprises a reactive power droop value (same or different) applied to the control loop of (Qg) and (Qmvb) at the first grid state; and upon detection of a grid fault, change the first reactive power droop scheme to a second reactive power droop scheme by changing the reactive power droop value applied to the control loop of one or both of (Qg) and (Qmvb) during recovery from the grid fault.

Various embodiments of the wind turbine system may include any one or combination of the control features discussed above with respect to the method embodiments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an embodiment of a wind turbine according to the present disclosure;

FIG. 2 illustrates a schematic view of an embodiment of a wind turbine DFIG system for use with the wind turbine shown in FIG. 1;

FIG. 3 is a schematic diagram of one embodiment of a power converter of a wind turbine according to the present disclosure;

FIG. 4 is a schematic diagram depicting real and reactive power flow in a wind turbine DFIG system with an integrated reactive power compensation device in accordance with aspects of the present disclosure;

FIG. 5 is a partial illustration of a wind tower depicting electronic components at a down-tower location within the in accordance with aspects of the present disclosure;

FIG. 6 is a voltage/time graph depicting reactive power response to a grid fault wherein a pre-fault reactive power droop scheme is maintained throughout recovery from the fault;

FIG. 7 is a voltage/time graph depicting the reactive power response of FIG. 6 wherein the pre-fault reactive power droop scheme is changed to a second droop scheme for the recovery from the fault;

FIG. 8 is a voltage/time graph depicting various reactive power droop constants as a function of grid voltage during recovery from a low/zero voltage grid fault;

FIG. 9 is a flow chart of control steps for implementing reactive power control in a wind turbine system in accordance with an embodiment of the present disclosure; and FIG. 10 is a schematic control diagram of the steps depicted in FIG. 9.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Although not limited to such configurations, for sake of explanation, the present method and system aspects of the invention are described herein with reference to a wind turbine power generating system, and more particularly to a wind turbine DFIG system that supplies real and reactive power to a grid. As mentioned above, the present invention proposes to integrate a dedicated reactive power compensation device with individual wind turbines, for example a device located at a down-tower location within the wind turbine tower and coupled to the power converter, and to utilize a novel reactive power droop scheme during transient voltage grid states in order to dampen reactive power oscillations between the generator and the reactive power compensation, particularly during quasi steady-state, transient, and fault recovery grid states, and to provide for faster post-fault voltage recovery.

As mentioned, it is recognized that in the field that it may be desirable to apply a bias or trim value to the voltage command signal in a generator to achieve a reasonable balance of reactive power between sources, such as between different wind turbine generators in a wind farm or between the generators and a common auxiliary reactive power source. For example, a farm-level voltage command signal may be adjusted as a function of a local reactive power droop characteristic for the wind turbine generator. This droop characteristic is generally preset, and may vary between the different wind turbine generators within a wind farm. For example, a preset 4% droop characteristic will provide a particular reactive current value at the generator's operating voltage, as compared to a 6% droop characteristic preset for a different wind turbine generator. The droop characteristic may be determined for the various wind turbines based on the impedance between that wind turbine and the wind farm substation bus. The use of the term "droop" in this disclosure is the same as known in the art to cause sharing of reactive power among various sources of reactive power on an alternating current (ac) power system.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy.

Wind power generation is typically provided by a wind farm having a large number (often 100 or more) of the wind turbines 10 with associated wind turbine generators 120 (FIG. 2), wherein each individual wind turbine 10 typically experiences a unique wind force. Accordingly, the output power for each individual wind turbine generator 120 may vary from one wind turbine 10 to another wind turbine 10 within the wind farm.

As is generally understood, active power (P) and reactive power (Q) are provided by each wind turbine generator 120. In some embodiments, a farm-level controller provides reactive power commands (Qcmd) to the wind turbine generators 120, based on transmission grid needs (which may be dictated by the grid operator or determined based on grid voltage). The (Qcmd) demand may be identical for each wind turbine generator. In an alternate control methodology, the reactive power commands may be individually tailored to the wind turbine generators 120 in the wind farm based on the different power generation characteristics of the respective wind turbine generators 120, as described, for example in U.S. Pat. Pub. No. 2015/0295529. It should be appreciated that the present invention is not limited to the manner or methodology in which the reactive power command for an individual wind turbine generator 120 is generated.

Referring now to FIG. 2, a schematic diagram of one embodiment of a wind turbine power system 100 ("wind turbine system") is illustrated in accordance with aspects of the present subject matter. In this embodiment, the wind turbine system 100 incorporates a DFIG configuration. Although the present subject matter will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gear box 118, which is, in turn, coupled to the generator 120, which may be a doubly fed induction generator (DFIG).

As shown, the DFIG 120 is connected to a stator bus 154. A power converter is connected to the DFIG 120 via a rotor bus 156, and to the stator bus 154 via a line side bus 188. The stator bus 154 provides an output multiphase power (e.g. three-phase power) from a stator of the DFIG 120, and the rotor bus 156 provides an output multiphase power (e.g. three-phase power) from a rotor of the DFIG 120. The power converter 162 includes a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 is coupled to a converter controller 174 in order to control the operation of the rotor side converter 166 and the line side converter 168. It should be noted that the converter controller 174 may be configured as an interface between the power converter 162 and a local wind turbine controller (control system) 176 and include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

As mentioned, for an individual DFIG wind turbine power system 100, the reactive power is supplied primarily by the RSC, via the generator 120 and the LSC.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 via the converter controller 174. The control signals may be based, among other things, on sensed conditions or operating characteristics of the wind turbine power system 100, and provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at hub 20 and blades 22. Therefore, mechanical and electrical rotor frequencies are decoupled and the electrical stator and rotor frequency matching is facilitated substantially independently of the mechanical rotor speed.

Under some conditions, the bi-directional characteristics of the power converter 162, and specifically, the bi-directional characteristics of the LSC 168 and RSC 166, facilitate feeding back at least some of the generated electrical power into generator rotor. More specifically, electrical power is transmitted from the stator bus 154 to line side bus 188 and subsequently through the line contactor 172 and into the power converter 162, specifically the LSC 168 which acts as a rectifier and rectifies the sinusoidal, three-phase AC power to DC power. The DC power is transmitted into DC link 136. Capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power with pre-determined voltages, currents, and frequencies. This conversion is monitored and controlled via converter controller 174. The converted AC power is transmitted from RSC 166 via rotor bus 156 to the generator rotor. In this manner, generator reactive power control is facilitated by controlling rotor current and voltage.

Referring now to FIG. 3, a schematic diagram of one embodiment of the power converter shown in FIG. 2 is illustrated in accordance with aspects of the present subject matter. As shown, the rotor side converter (RSC) 166 includes a plurality of bridge circuits (e.g. H-bridge circuits), with each phase of the rotor bus 156 input to the rotor side converter 166 being coupled to a single bridge circuit. In addition, the line side converter (LSC) 168 may also include a plurality of bridge circuits. Similar to the rotor side converter 166, the line side converter 168 also includes a single bridge circuit for each output phase of the line converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 3, each bridge circuit includes an upper IGBT (e.g. IGBT 212) and a lower IGBT (e.g. IGBT 214). In addition, a diode may be coupled in parallel with each of the IGBTs. In alternative embodiments, parallel IGBTs and diodes may be used to increase the current rating of the converter. As is generally understood, the line side converter 168 and the rotor side converter 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

FIG. 4 depicts real (P) and reactive (Q) power flow in a wind turbine power system 100 configured with a DFIG system 102. As understood in the art, the primary source of reactive power in the DFIG system is from the RSC 166 via the generator 102 (generator stator-side reactive power (Qs)) and from the LSC 168 (generator line-side reactive power (Ql)). A harmonic distortion filter 175 is configured in the line side bus. Use of the power converter 162, in particular the RSC 166, to control the rotor current makes it is possible to adjust the total reactive power (Qwtg) of the system 100 fed to the grid from the RSC 166 independently of the rotational speed of the generator 102. In addition, the DFIG generator 102 is able to import or export reactive power, which allows the system to support the grid during extreme voltage fluctuations on the grid.

Still referring to FIG. 4, the wind turbine power system 100 includes a dedicated reactive power compensation device 200 (also referred to herein as a modular VAR Box (MVB)) that generates an auxiliary reactive power (Qmvb). In the depicted embodiment, the reactive power compensation device 200 is connected to the line side bus 188 (with a different harmonic distortion filter 175) at connection point 204 such that (Qmvb) combines with (Ql) on the line side bus as (Q), wherein (Q) and (Qs) are combined at the three-way transformer 202. Thus, total reactive power (Qwtg) from the wind turbine power system 100 is:

$$(Qwtg)=(Qs)+(Q), \text{ wherein}$$

$$(Q)=(Ql)+(Qmvb)$$

Total reactive power (Qwtg) and total real power (Pwtg) are delivered from the transformer 202 to the grid.

The maximum reactive power capacities for (Qmvb), (Qs), and (Ql) are determined in real-time based on any one or combination of: power system operating state; ambient temperature; or thermal constraints of the generator; power converter, or reactive power compensation device. The values for (Qmvb), (Qs), and (Ql) may be continuously or periodically determined and updated in the control system.

The reactive power compensation device 200 may be any one or combination of a Static VAR compensator (SVC), a Static VAR Generator (SVG) device, or a Static Synchronous Compensator (STATCOM) device.

In the depicted embodiment of FIG. 4, the reactive power compensation device 200 is connected with the line side bus 188 at the connection point 204. Thus, both the LSC 168 and the MVB 200 are commonly connected to the same three-way transformer 202.

Referring to FIG. 5, a down-tower location 226 is depicted within the wind turbine tower 12. As in generally understood in the art, the "down-tower" location is at or near the ground level within the tower 12 where the electronic control cabinets are located, including the power converter 162 and controller 174. With various conventional wind turbine systems 100, a cooling system 210 (with heat exchanger 214) is configured to deliver a cooling medium (e.g. air or liquid) to the electronic components to maintain the components within an acceptable operating temperature range. The MVB 200 is also located at the down-tower location 226 in proximity to the power converter 162 and is also cooled by the same cooling system 210. In this embodiment, the power converter controller 174 is configured with a LSC controller 206 and a RSC controller 208. A control line 224 connects the LSC controller 206 with the MVB 200 so that the MVB is also controlled by the LSC controller 206. FIG. 5 is not intended to limit location of the MVB 200, power converter 162, or cooling system. In other embodiments, these components may be located in an up-tower location closer to the nacelle.

As discussed above, a total reactive power demand (Qcmd) is made on the wind turbine system 100 at a first grid state, such as a steady-state voltage on the grid. This (Qcmd) command may be generated, for example, by a farm-level controller in a wind farm that encompasses multiple wind turbines. The total (Qcmd) is allocated between generator reactive power (Qg) and compensation device reactive power (Qmvb). Referring to FIG. 4, it is appreciated that (Qg) is the sum of (Qs) and (Ql).

A first reactive power droop scheme is determined that includes a reactive power droop value (the same or different) applied to the control loop one or both of (Qg) and (Qmvb) at the first grid state, which may be a steady-state voltage on the grid. For example, referring to FIG. 6, a voltage/time graph is provided that depicts a first reactive power droop scheme 215 prior to a low voltage grid fault at time=10 sec. The signal labeled "a" is total reactive power from the DFIG system 100 at the point of connection with the grid. The signal labeled "b" corresponds to (Qmvb) from the reactive power compensation device. The signal labeled "c" corresponds to (Qs). The signal labeled "d" corresponds to (Ql).

As discussed, (Qg) is the sum of (Qs) and (Ql). In the example of FIG. 6, (Qg)=1500 kVar; (Qmvb)=1000 kVAr; and (Qs)=300 kVar; and (Ql)=200 kVar.

The first reactive power droop scheme 215 applies a 5% droop value to the control loop that determines and maintains (Qg) and a 0% droop value to the control loop for (Qmvb). These values are determined to minimize reactive power oscillations between the generator and the reactive power compensation device at steady-state grid voltages.

The low voltage grid fault occurs at time=10 sec. and is a 40% grid voltage drop for a 0.5 sec. duration. FIG. 6 depicts the LVRT (Low Voltage Ride Through) response of the system 100 wherein the first reactive power scheme is maintained throughout the fault and recovery. Thus, in the example of FIG. 6, a second reactive power scheme is not utilized. As indicated in the graph of FIG. 6, the fault recovery time for the generator to reach the pre-fault operating point takes about 3 seconds.

FIG. 7 depicts the same grid fault, (Qg) and (Qmvb) values, and first reactive power scheme 215 (i.e., 5 % droop applied to the (Qg) control loop and 0% droop applied to the (Qmvb) control loop) as in FIG. 6. In this example, however, a post-fault second droop scheme 217 is implemented wherein the 5% droop applied to (Qg) in the first scheme 215 is changed to 0% during the recovery. As indicated in the graph of FIG. 7, the recovery time is significantly improved to approximately 2 seconds (as compared to 3 seconds in FIG. 6).

Thus, in the example of FIG. 7, in the second reactive power scheme 217 only one of the reactive power droop values was changed from the first reactive power scheme. It should be appreciated, however, that the method includes changing both of the reactive power droop values applied to the (Qg) and (Qmvb) control loops in the second power scheme 217. For example, in another example, the first reactive power scheme may include a 5% droop value applied to each of the (Qg) and (Qmvb) control loops, wherein this is changed to 0% applied to each of the (Qg) and (Qmvb) control loops in the second reactive power scheme.

The second droop scheme 217 may include 0% droop applied to each of (Qg) and (Qmvb) for a predefined time period (e.g., 100 msec.). The second droop scheme 217 may include additional droop values determined and applied independently to each of (Qg) and (Qmvb) after the initial 0% droop period.

The second droop scheme 217 may include a plurality of different droop values applied to one or both of the (Qg) and (Qmvb) control loops according to a timed, predefined profile. For example, FIG. 8 depicts a graph of predefined of a second droop scheme 217 for a particular DFIG configuration that may be implemented for a low or no voltage grid fault. At time=0, a no voltage grid fault occurs (duration of about 0.5 sec) that results in the control system associated with the DFIG and the reactive power compensation device implementing a second reactive power scheme at about time=0.5 sec. It should be appreciated that FIG. 8 is provided as an example of a droop scheme profile that may be applied to one or both of the (Qg) and (Qmvb) control loops, wherein the profile is independently determined and stored for each of (Qg) and (Qmvb).

Still referring to the graph of FIG. 8, a first droop value (Kdroop1) is applied at time=0.5 sec. and increases (linearly or non-linearly) to time=1.0 sec. where a second droop value (Kdroop2) is implemented, which also increases to time=3.0 sec. At time=3.0, a step increase to a third droop value (Kdroop3) is implemented, wherein this value is held until time=10.0 sec. At time=10.0 sec., a step increase to a fourth droop value (Kdroop4) is implemented and held until time=600 secs. At this time, a step increase to a fifth droop value (Kdroop5) is implemented. At the end of the fault recovery, the reactive power droop returns to its original pre-fault value (Kdroop_original), which is the value in the first reactive power scheme.

A plurality of the predefined profiles used in the second reactive power scheme 217 for the (Qg) and (Qmvb) control loops may be pre-determined and stored in a look-up table, wherein a particular profile is selected as a function of type of grid fault, or any other combination of variables, such as the (Qcmd) demand made on the wind turbine system, initial values and/or capacity of (Qg) and (Qmvb), and so forth.

FIG. 9 depicts an exemplary control method 220 of an embodiment in accordance with aspects of the present disclosure. The method 220 reflects the control loop process for (Qg) depicted in FIG. 10, wherein a droop value is applied in the control loop as discussed above. The method 220 starts at step 222. At step 224, a reactive power command (Qcmd) for the wind turbine system is received, for example from a farm-level controller. A reactive power feedback signal (Qg_fbk) from the DFIG and a grid voltage feedback signal (Vg_fbk) are also generated. If grid voltage indicates a transient or fault state on the grid, then based on the grid voltage, the second reactive power droop scheme is implemented.

At step 226, (Qcmd) is allocated to (Qmvb) assigned to the reactive power compensation device and (Qg_cmd) assigned to the DFIG. A reactive power command (Qg_cmd) is generated for the DFIG. At step 228, (Qmvb) is transmitted to the controller for the reactive power compensation device, wherein a parallel process of the remaining steps 230-244 indicated in FIG. 9 proceeds for determination and application of droop to be applied to the (Qmvb) control loop.

At step 230, a droop value (K_droop) is determined for (Qg_cmd) in the second reactive power droop scheme. This (K_droop) value may be selected from a plurality of stored profiles, as discussed above, or in an alternate embodiment, may be computed in real-time.

At step 232, an intermediate voltage command (V_cmd_int) is generated based on (Qg_cmd and Qg_fbk).

At step 234, the (K_droop) value is applied to (Q_fbk) to calculate voltage droop (Vdroop).

At step 236, a final voltage command (Vg_cmd) is calculated based on (V_cmd_int) and (Vdroop).

At step 238, a reactive current command (Iy_cmd) is generated, and at step 240 a power converter voltage command (Vy_cmd) is generated from (Iy_cmd).

At step 242, the (Vy_cmd) is used to generate a modulation index for the power converter, which is primarily responsible for generation of reactive power from the DFIG.

The process ends at step 244. It is understood, however, that the applicable steps of the method 220 will be repeated for changes in droop value for the DFIG as dictated by the stored (K_droop) profile, as discussed above.

Various aspects and embodiments of the present invention are defined by the following numbered clauses:

1. A method for operating a wind turbine system that provides real and reactive power to a grid, the wind turbine system including a generator with a power converter and an integrated reactive power compensation device, the method comprising:

receiving a total reactive power demand (Qcmd) made on the wind turbine system at a first grid state;

allocating (Qcmd) to generator reactive power (Qg) and compensation device reactive power (Qmvb);

determining a first reactive power droop scheme that comprises a reactive power droop applied to a control loop for one or both of (Qg) and (Qmvb) at the first grid state;

upon detection of a grid fault, changing the first reactive power droop scheme to a second reactive power droop scheme by changing the reactive power droop value applied to one or both of (Qg) and (Qmvb) control loops during recovery from the grid fault.

2. The method as in clause 1, wherein the second reactive power droop scheme comprises a predefined profile of droop values during the recovery from the grid fault.

3. The method as in any one of clauses 1-2, wherein the predefined profile comprises a plurality of different droop values for different predefined times during the recovery from the grid fault.

4. The method as in any one of clauses 1-3, wherein a plurality of the predefined profiles are stored in a look-up table and selected as a function of type of grid fault.

5. The method as in any one of clauses 1-4, wherein the reactive power droop values applied to the (Qg) and (Qmvb) control loops in the second reactive power droop scheme are independently determined and have the same or different droop values during the recovery from the grid fault.

6. The method as in any one of clauses 1-5, wherein the second reactive power droop scheme comprises zero droop value applied to the control loops of (Qg) and (Qmvb) for at least one predefined time period during the recovery from the grid fault.

7. The method as in any one of clauses 1-6, wherein the power converter and the reactive power compensation device are configured at a down-tower location in a tower of the wind turbine system.

8. The method as in any one of clauses 1-7, wherein the generator comprises a doubly fed induction generator (DFIG), the power converter comprising a line side converter (LSC) and a rotor side converter (RSC), wherein (Qg) comprises a generator stator-side reactive power (Qs) and a generator line-side reactive power (Ql), the reactive power compensation device configured with the DFIG such that (Qmvb) combines with (Ql).

9. The method as in any one of clauses 1-8, wherein the grid fault is one of low voltage, zero voltage, or high voltage fault.

10. A wind turbine system configured to supply real and reactive power to a grid, comprising:

a wind turbine with a tower, rotor, hub, and a plurality of blades coupled to the hub;

a doubly fed induction generator (DFIG) system coupled to the rotor, the DFIG system further comprising a power converter with a line side converter (LSC) and a rotor side converter (RSC), wherein the DFIG system is configured to generate a generator reactive power (Qg);

a dedicated reactive power compensation device operationally configured with the DFIG system to generate a reactive power (Qmvb);

a control system configured to:

determine a total reactive power demand (Qcmd) made on the wind turbine system at a first grid state;

allocate (Qcmd) to generator reactive power (Qg) and compensation device reactive power (Qmvb);

determine a first reactive power droop scheme that comprises a reactive power droop value applied to a control loop for one or both of (Qg) and (Qmvb) at the first grid state;

upon detection of a grid fault, changing the first reactive power droop scheme to a second reactive power droop scheme by changing the reactive power droop value applied to one or both of (Qg) and (Qmvb) control loops during recovery from the grid fault.

11. The wind turbine system as in clause 10, wherein the control system is configured such that the reactive power droop values in the second reactive power droop scheme follow a predefined profile during the recovery from the grid fault.

12. The wind turbine system as in any one of clauses 10-11, wherein the predefined profile comprises a plurality of different droop values for different predefined times during the recovery from the grid fault.

13. The wind turbine system as in any one of clauses 10-12, wherein the control system is configured such that the predefined profile is selected from a plurality of the predefined profiles stored in a look-up table and selected as a function of type of grid fault.

14. The wind turbine system as in any one of clauses 10-13, wherein the control system is configured such that the reactive power droop values applied to (Qg) and (Qmvb) control loops in the second reactive power droop scheme are independently determined and have the same or different droop values during the recovery from the grid fault.

15. The wind turbine system as in any one of clauses 10-14, wherein the control system is configured such that the reactive power droop values applied to the (Qg) and (Qmvb) control loops are zero for at least one predefined time period during the recovery from the grid fault.

16. The wind turbine system as in any one of clauses 10-15, wherein the power converter and the reactive power compensation device are configured at a down-tower location in the tower.

17. The wind turbine system as in any one of clauses 10-16, wherein the reactive power compensation device comprises any one or combination of a Static VAR compensator (SVC), a Static VAR Generator (SVG) device, or a Static Synchronous Compensator (STATCOM) device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine system that provides real and reactive power to a grid, the wind turbine system including a generator with a power converter and an integrated reactive power compensation device, the method comprising:

receiving a total reactive power demand (Qcmd) made on the wind turbine system at a first grid state;

allocating the Qcmd to a generator reactive power (Qg) and a compensation device reactive power (Qmvb);

determining a first reactive power droop scheme that comprises a reactive power droop applied to a control loop for one or both of the Qg and the Qmvb at the first grid state;

upon detection of a grid fault, changing the first reactive power droop scheme to a second reactive power droop scheme by changing the reactive power droop value applied to one or both of the Qg and Qmvb control loops during recovery from the grid fault.

2. The method as in claim 1, wherein the second reactive power droop scheme comprises a predefined profile of droop values during the recovery from the grid fault.

3. The method as in claim 2, wherein the predefined profile comprises a plurality of different droop values for different predefined times during the recovery from the grid fault.

4. The method as in claim 3, wherein a plurality of the predefined profiles are stored in a look-up table and selected as a function of type of grid fault.

5. The method as in claim 1, wherein the reactive power droop values applied to the Qg and Qmvb control loops in the second reactive power droop scheme are independently determined and have the same or different droop values during the recovery from the grid fault.

6. The method as in claim 1, wherein the second reactive power droop scheme comprises zero droop value applied to the control loops of (Qg) and (Qmvb) for at least one predefined time period during the recovery from the grid fault.

7. The method as in claim 1, wherein the power converter and the reactive power compensation device are configured at a down-tower location in a tower of the wind turbine system.

8. The method as in claim 7, wherein the generator comprises a doubly fed induction generator (DFIG), the power converter comprising a line side converter (LSC) and a rotor side converter (RSC), wherein (Qg) comprises a generator stator-side reactive power (Qs) and a generator line-side reactive power (Ql), the reactive power compensation device configured with the DFIG such that Qmvb combines with Ql.

9. The method as in claim 1, wherein the grid fault is one of low voltage, zero voltage, or high voltage fault.

10. A wind turbine system configured to supply real and reactive power to a grid, comprising:

a wind turbine with a tower, rotor, hub, and a plurality of blades coupled to the hub;

a doubly fed induction generator (DFIG) system coupled to the rotor, the DFIG system further comprising a power converter with a line side converter (LSC) and a rotor side converter (RSC), wherein the DFIG system is configured to generate a generator reactive power (Qg);

a dedicated reactive power compensation device operationally configured with the DFIG system to generate a reactive power (Qmvb);

a control system configured to:

determine a total reactive power demand (Qcmd) made on the wind turbine system at a first grid state;

allocate the Qcmd to the generator reactive power (Qg) and the compensation device reactive power (Qmvb);

determine a first reactive power droop scheme that comprises a reactive power droop value applied to a control loop for one or both of the Qg and the Qmvb at the first grid state;

upon detection of a grid fault, changing the first reactive power droop scheme to a second reactive power droop scheme by changing the reactive power droop value applied to one or both of the Qg and Qmvb control loops during recovery from the grid fault.

11. The wind turbine system as in claim 10, wherein the control system is configured such that the reactive power droop values in the second reactive power droop scheme follow a predefined profile during the recovery from the grid fault.

12. The wind turbine system as in claim 11, wherein the predefined profile comprises a plurality of different droop values for different predefined times during the recovery from the grid fault.

13. The wind turbine system as in claim 11, wherein the control system is configured such that the predefined profile is selected from a plurality of the predefined profiles stored in a look-up table and selected as a function of type of grid fault.

14. The wind turbine system as in claim 10, wherein the control system is configured such that the reactive power droop values applied to the Qg and Qmvb control loops in the second reactive power droop scheme are independently determined and have the same or different droop values during the recovery from the grid fault.

15. The wind turbine system as in claim 10, wherein the control system is configured such that the reactive power droop values applied to the Qg and Qmvb control loops are zero for at least one predefined time period during the recovery from the grid fault.

16. The wind turbine system as in claim 10, wherein the power converter and the reactive power compensation device are configured at a down-tower location in the tower.

17. The wind turbine system as in claim 10, wherein the reactive power compensation device comprises any one or combination of a Static VAR compensator (SVC), a Static VAR Generator (SVG) device, or a Static Synchronous Compensator (STATCOM) device.

* * * * *